(12) United States Patent
Johnson et al.

(10) Patent No.: US 8,162,573 B2
(45) Date of Patent: Apr. 24, 2012

(54) SELF-REVERSING TAPPING SYSTEM

(75) Inventors: Allan S. Johnson, Harrison, ID (US);
Mark F. Johnson, Harrison, ID (US)

(73) Assignee: The Tapmatic Corporation, Post Falls, ID (US)

( * ) Notice: Subject to any disclaimer, the term of this patent is extended or adjusted under 35 U.S.C. 154(b) by 939 days.

(21) Appl. No.: 10/935,900

(22) Filed: Sep. 7, 2004

(65) Prior Publication Data
US 2006/0051170 A1 Mar. 9, 2006

(51) Int. Cl.
*B23B 51/06* (2006.01)
*B23G 1/46* (2006.01)

(52) U.S. Cl. ............ 408/56; 408/57; 408/139

(58) Field of Classification Search ........ 408/59, 408/139, 141, 56–57; 470/198–199; *B23G 1/16, B23G 3/00*
See application file for complete search history.

(56) References Cited

U.S. PATENT DOCUMENTS

| | | | |
|---|---|---|---|
| 3,487,748 A * | 1/1970 | Grage | ............. 409/136 |
| 3,946,844 A | 3/1976 | Johnson | |
| 3,999,642 A | 12/1976 | Johnson | |
| 4,002,348 A | 1/1977 | Johnson | |
| 4,014,421 A | 3/1977 | Johnson | |
| 4,067,424 A | 1/1978 | Johnson | |
| 4,396,317 A * | 8/1983 | Staron et al. | ............. 408/59 |
| 4,531,865 A | 7/1985 | Johnson | |
| 4,566,829 A | 1/1986 | Johnson | |
| 4,640,652 A * | 2/1987 | Rivera, Jr. | ............. 409/136 |
| 4,705,437 A | 11/1987 | Johnson | |
| 4,722,643 A | 2/1988 | Johnson | |
| 4,832,542 A | 5/1989 | Johnson et al. | |
| 5,011,344 A | 4/1991 | Johnson | |
| 5,131,794 A | 7/1992 | Johnson | |
| 5,143,161 A | 9/1992 | Vindez | |
| 5,174,424 A | 12/1992 | Eriksson | |
| 5,195,624 A | 3/1993 | Eriksson | |
| 5,203,651 A | 4/1993 | Johnson | |
| 5,209,616 A | 5/1993 | Johnson | |
| 5,213,453 A | 5/1993 | Eriksson | |
| 5,263,799 A * | 11/1993 | Blessing | ............. 408/139 |
| 5,271,697 A | 12/1993 | Johnson et al. | |
| 5,358,362 A | 10/1994 | Johnson | |
| 5,419,661 A * | 5/1995 | Meachum | ............. 408/57 |
| 5,628,593 A | 5/1997 | Johnson | |
| 5,669,743 A | 9/1997 | Johnson et al. | |
| 5,865,575 A | 2/1999 | Johnson | |
| 6,019,552 A * | 2/2000 | Watzke | ............. 408/139 |
| 6,340,276 B1 * | 1/2002 | Watzke | ............. 408/10 |
| 6,348,003 B1 | 2/2002 | Johnson et al. | |
| 6,569,022 B2 | 5/2003 | Johnson et al. | |

* cited by examiner

*Primary Examiner* — Daniel Howell
(74) *Attorney, Agent, or Firm* — Wells St. John P.S.

(57) ABSTRACT

This invention generally pertains to a self-reversing tapping apparatus system, and more particularly, embodiments of this system include an improved coolant system, a reduction of the components which reverse rotational direction, and provides a modular tapping apparatus system.

5 Claims, 10 Drawing Sheets

SELF-REVERSING TAPPING SYSTEM

CROSS REFERENCE TO RELATED APPLICATION

There are no related applications.

TECHNICAL FIELD

This invention generally pertains to a self-reversing tapping apparatus system, and more particularly to such a system which includes an improved coolant system.

BACKGROUND OF THE INVENTION

In machining metallic work pieces, an apparatus called a tap is used to create internally threaded holes for receiving screws in the metallic work pieces. The tap itself is a tool with external cutting threads. In order to create the internally threaded hole in the work piece, the tap is rotated and driven into the work piece to the desired hole depth, and then once the tap reaches the desired depth, the rotation of the tap driver and consequently the tap is reversed and the tap is retracted from the base material or work piece.

The tap is held by a what is referred to as a tap driver, tapping apparatus or tapping system, and the tap driver is held or secured within a machine. There are generally two types of tapping systems, namely those wherein the reversing of the tap attachment is provided by the machine which is driving the rotation of the tap, and those systems wherein the tap attachment itself provides the reversal of the rotation. The latter are generally referred to as self-reversing.

With taps that may be rotated at three thousand (3,000) to six thousand (6,000) revolutions per minute ("rpms"), the quick stopping of the forward rotation and the immediate reversal of the direction of the rotation creates stresses. Furthermore, a portion of the self-reversing taps utilized axial movement of components within the tap body in order to initiate or facilitate the reversal in rotation of the drive spindle, and consequently the chuck which holds the tap, as well as the tap.

Tapping also normally requires the lubrication of, or the providing of coolant to, the tap and/or hole being tapped. The general types of coolant systems are referred to as internal coolant systems and/or external coolant systems. The external tap coolant systems generally include the spraying of coolant and/or lubricant on the workpiece and/or tap itself to provide sufficient or desired coolant to the hole being tapped. In a typical embodiment of this approach, a significant amount of coolant is flooded in the area. The internal tap coolant systems generally provide high pressure coolant to the tap area through passageways in the tapping attachment, which generally outlet at or near where the tap is held to the tap body (this may also be referred to as the chuck or chuck portion).

There are different types of devices and mechanisms which provide internal coolant systems, and one such type is referred to as a balanced coolant system. In many or all of the self-reversing taps, the drive spindle moves axially as it engages and/or disengages the reverse and forward rotation configurations, and the forces around the reciprocating parts or components within the tapping attachment should be maintained to prevent the undesired or untimely axial or reciprocating movement of those components.

If the high pressure coolant were merely introduced through the tap attachment and to the area where the tap is attached, it may tend to cause the axial movement of the drive spindle and other components when such movement is not desired. In order to reduce or avoid this type of undesirable axial movement, the high pressure coolant is routed on two sides of some components and/or distributed so that the pressure on the respective parts and/or surfaces is balanced and does not cause undesired axial movement of internal components such as the drive spindle.

As background for some aspects of the invention and to show alternative components which may be used in other aspects of the invention, examples of prior self-reversing tapping attachment patents include: U.S. Pat. Nos. 3,999,642; 4,002,348; 4,014,421; 4,566,829; 4,705,437; 4,832,542; 5,174,424; 5,195,624; 5,203,651; 5,209,616; 5,213,413; and 5,628,593, all of which are hereby incorporated herein by this reference. The aforesaid patents and application disclose and claim tapping attachments.

Prior patents and devices include a tap holding spindle and simultaneous rotation of forward and reverse drivers, the spindle being freely floating and moveable axially with respect to the forward and reverse drivers. Under forward drive in which the tap holder spindle is driven by the forward driver, the tap threads a hole being tapped in the workpiece and thereby screws itself into the hole. Upon cessation of feed by the driving machine with retraction of the driving machine, relative axial movement results between the tap holding spindle and the driver members such that the forward drive member becomes disengaged from the tap spindle, which at this point is held relatively stationary due to the fact that the tap has become fastened to the workpiece. Upon further retraction movement by the tapping machine and further relative movement, the reverse drive member becomes engaged with the tap holding spindle, causing reverse rotation thereof and thereby unscrewing the tap from the hole. In this manner, self-reversing by the tapping attachment itself as opposed to reversing by the driving machine, is accomplished.

With the advent of Computer Numeric Control (CNC) machining centers, self-reversing has become of greater and greater importance in that it causes reversing to occur in the tapping attachment, as opposed to requiring the driving machine to reverse its direction of rotation.

Self-reversing tapping attachments have particular parts, which due to the very nature of self-reversing suffer greater stress and wear than other parts, especially in connection with modern ultra-high-speed tapping. A portion of such stress and wear may primarily occur in the transition between forward and reverse, wherein the balls in the coupling on the tap holding spindle proceed through a limited neutral zone between engagement with splines on the forward drive element and splines on the reverse drive element. The mass of the components that are rotating in the forward direction and need to be reversed impacts the wear, operation and expense of these tapping attachments.

It is also desirable in self-reversing taps or tapping attachments, to minimize the mass of components which reverse directions with the drive spindle, due to numerous obvious and/or known concerns.

In tapping attachments which include both rotational and axial movement of the drive spindle, it is also more difficult to provide a sealed conduit, passageway and/or lubricated cavity when the seal must be provided in an environment wherein there is both rotational and axial movement. In most sealing applications for higher pressure coolant or fluid, it is normally preferred at one location or interface to only provide sealing for either rotational movement or for axial movement, but not for both at the same location or seal.

Known prior self-reversing tapping attachments, which also include a coolant system, typically integrate most or all of the cooling system components and sealing components into the drive spindle and/or tap attachment body such that when excessive wear occurs, the entire tap attachment is replaced.

In addition to the high pressure coolant passageways, conduits and lubricated cavity areas, there is also one or more internal cavities within the tap attachments, and said passageways, conduits and lubricated cavity areas are preferably operated without coolant therein. However there are multiple ways that coolant can get into the internal cavity, from the high pressure coolant areas and/or from the exterior (such as from a pumping or sucking action of the seals when the tap attachment is moving axially). It is undesirable to allow coolant to collect in or fill the internal body cavity of the tap attachment, although it tends to happen in most applications. If the non-high pressure cavity collects an undesirable amount of coolant, it can alter the operation of the tap attachment in several ways, such as altering the location of the tap itself so that inaccuracies or failures occur.

It is therefore an object of some embodiments of this invention to provide an improved self-reversing tapping or tap attachment.

It is a further object of some embodiments of this invention to provide a coolant system for use in a tapping apparatus or tapping system which does not reverse rotation with the drive spindle.

It is a further object of some embodiments of this invention to provide a modular coolant system which may be attached or detached from the remainder of the tapping attachment.

It is a further object of some embodiments of this invention to provide a tap attachment body cavity drain or evacuation system.

It is a further object of some embodiments of this invention to provide a modular tap attachment.

It is a further object of some embodiments of this invention to provide lighter components which reverse their rotation and to reduce the number and weight of the components that reverse in the direction of their rotation.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

It will also be appreciated by those of ordinary skill in the art that embodiments of this invention incorporate or utilize a balanced receiver of the internal coolant flow of the machine, which permits inflow into the coolant tube throughout the full length of its movement as the tap holding spindle moves axially from forward rotation to reverse rotation. This coolant tube 109 moves axially within the guide spindle 121 and is guided by a sliding hex section engaged by the return spring retaining nut, which is locked by threads to the guide spindle 121. Therefore, the coolant tube 109 rotates with the guide spindle 121, which rotates with the mount by way of the positive lock of the guide spindle 121 thereto. These components always rotate together in one direction, that is in the forward rotational direction.

The tap holding spindle rotates in both forward and reverse rotation independent of the coolant tube. This design permits the use of single purpose seals, two that contain the input flow of coolant to the area desired, their only function is a sliding non-rotating seal 125, and one just above the tap that only functions as a fixed rotational seal 138. This insures long, trouble free performance, as experience has shown that multi-functional seals (sliding, rotating and reversing) do not stand up well in high speed, high pressure applications. When worn they leak and cause coolant intrusions into the interior of the tapping attachment.

Additionally, this coolant system is designed so that it does not add weight to the tap holding spindle, it is independent of this component and thereby permits the tap holding spindle, which does of course reverse, during operation to remain as light as possible, and this permits higher operating speeds. The less weight changing rotational direction at high speed the less wear and tear on the components.

The moisture expellers or coolant drainage system in the lower body of the tapping attachment serve as a back up to the coolant system itself as any leakage, which may eventually occur through prolonged use, cannot accumulate within the tapping head. The expellers serve as filtered drains that allow liquid to exit the unit in either a vertical or horizontal application through their unique placement at an angle that permits them to function efficiently under all planes of operation. Liquid can only exit these filters, not enter from the exterior of the tool since no sucking action is possible. Constant volume is maintained within the tapping attachment body through use of a diaphragm in its side.

The features of this invention result in the possibility of higher tapping speeds with higher internal coolant pressures, and less maintenance. The tap holding spindle can be manufactured from steel or aluminum depending upon the application, which is allowed due to the lower mass of reversing components.

The coolant tube and the balanced receiver are preferably manufactured from corrosion resistant materials and the coolant tube itself is coated with a special 0.70 RC material at the areas engaged by seals insuring the smoothest operation and the longest seal life.

The guide spindle nut 114 which guides the coolant tube 109 and keeps it in rotation with the guide spindle through a broached or EDM's connection, is preferably manufactured from tool steel and coated with Tungsten Carbide Carbon (WCC) to reduce wear and minimize sliding friction. It will be appreciated by those of ordinary skill in the art that while the types of connections, materials or finishes are stated herein, this invention is not limited to any one type.

Figure 1:
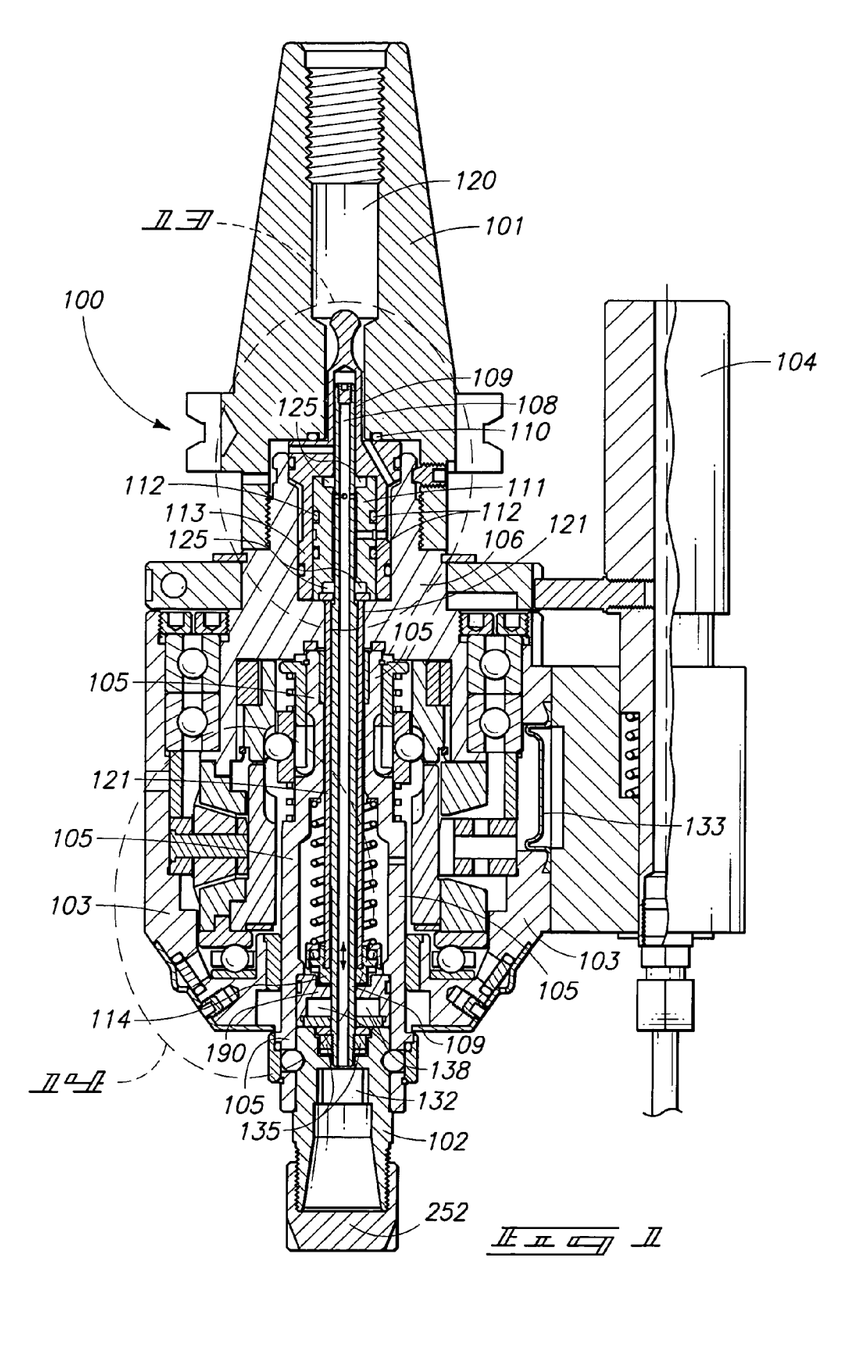
FIG. 1 is a section view of one embodiment of a tapping attachment contemplated by this invention, in the contracted position such that the tap is rotated in the forward direction.

FIG. 1 is a section view of one embodiment of a tapping attachment 100 contemplated by this invention, in the contracted position such that the tap is rotated in the forward direction. In this position all components would be rotating in the forward direction. FIG. 1 illustrates tapping attachment 100 (may also be referred to as tapping apparatus or tapping system), with machine shank 101, or machine mount, coolant inlet 120 in machine shank 101, drive spindle 105, machine attachment 104, housing 103, and chuck portion 102 for holding a tap. Coolant enters the chuck area at coolant entry 132 where it may be applied in any one of a number of ways, such as around a tap or through a hole through a tap, with no one configuration being required to practice this invention.

FIG. 1 shows coolant tube 109, guide spindle nut 114, guide spindle 121 which may include external threads to engage with guide spindle nut 114. Coolant tube passageway 108 within coolant tube 109 provides a conduit or aperture through which coolant may be received from a source of coolant and routed to or toward the tap.

The coolant system in this embodiment of the invention generally includes a coolant tube 109, an upper seal holder 111 and an upper seal holder body 113, the guide spindle nut 114, and guide spindle 121. The guide spindle 121 is preferably part of the coolant system but is not absolutely necessary as its function may be in other components. It will further be appreciated by those of ordinary skill in the art that for purposes of the coolant system aspect of this invention, one or more of the components may be made integral to one another, all within the contemplation of this invention. However, it is preferable to configure some components separately to achieve objectives of other aspects of other embodiments of the invention. Elastomeric seals 112 are shown within upper seal body 113 between the upper seal holder 111 and the upper seal holder body 113.

Housing body portion 106 surrounds the upper seal holder body 113. O-ring seals 110 are provided between upper seal holder body 113 and machine shank 101. FIG. 1 further shows a diaphragm 133 which prevents a vacuum from forming within the interior cavity or cavities of the tapping attachment housing.

Figure 15:
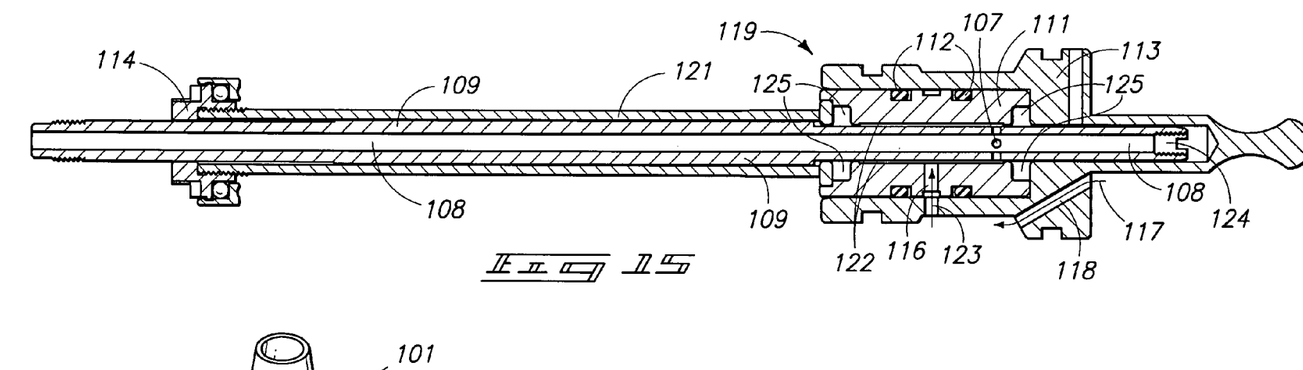
FIG. 15 is an elevation view of an embodiment of a coolant system which may be utilized in the embodiment of the invention shown in FIG. 1.

FIG. 15 and the description relative to FIG. 15 describes the coolant system and coolant flow in more detail.

Figure 2:
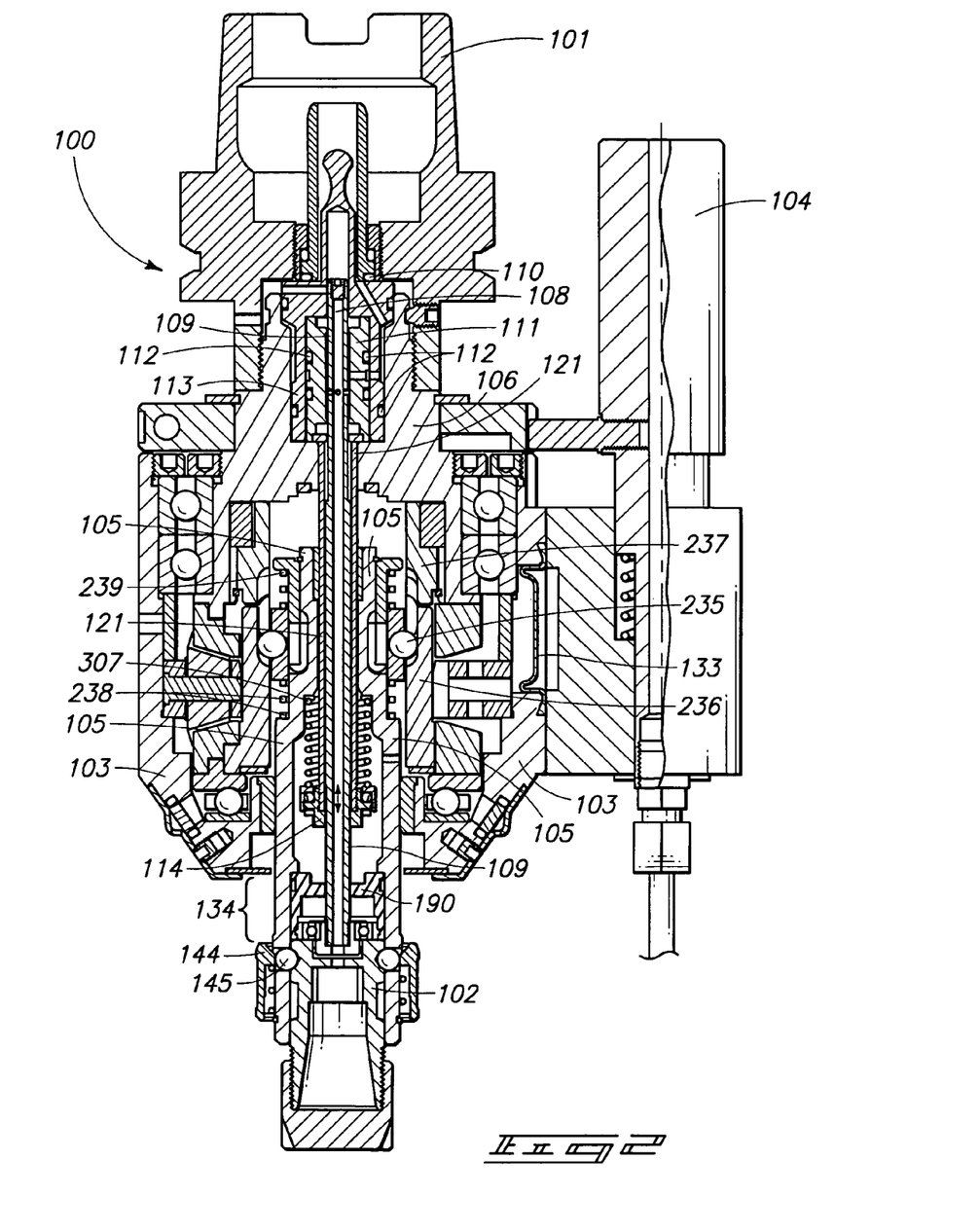
FIG. 2 is a section view of the embodiment of a tapping attachment contemplated by this invention shown in FIG. 1, in the expanded position such that the tap is rotated in the reverse direction.

FIG. 2 is a section view of the embodiment of a tapping attachment contemplated by this invention shown in FIG. 1, in the expanded or axially extended position such that the tap is rotated in the reverse direction when in such position. The travel distance 134 or extension distance is illustrated in FIG. 2. The items are numbered the same as in FIG. 1 and will not therefore be repeated here.

The rotation of the tap is in a reverse direction in this extended position. Many or most of the components are still rotating in the forward direction, with only the reversing components rotating in the reverse direction. One advantage of some embodiments of this invention is the reduction of the number and mass of components and/or parts that reverse their rotational direction when the drive spindle reverses direction to reverse the direction of the tap. This reduces inertia, the stopping required before the direction is reversed, the strength and mass required of certain parts, such as the drive spindle 105. In the embodiment shown in FIGS. 1 & 2, the components which reverse their direction of rotation are: the drive spindle 105; the mini-insert 102; the anti-friction washer 330, and the rotary seal holder 190.

The guide spindle nut 114 is a sliding hex nut attached to the guide spindle 121 and the coolant tube 109, such that the coolant tube 109 and the guide spindle 121 always rotate in the forward direction. The guide spindle nut 114 is also a retaining nut for the guide spring 139 in the embodiment of the invention illustrated. There is a corresponding external hex (109c in FIG. 11) on the coolant tube 109 which interacts or interconnects with the internal hex on the guide spindle nut 114, to drive the coolant tube 109 in the forward direction at all times. The coolant tube nut 135 (shown in FIG. 1) causes the coolant tube 109 to move axially relative to the drive spindle 105 even though it does not rotate in the reverse rotational direction with the drive spindle 105.

The rotary seal holder 190 with rotary seals 138 (shown in FIG. 1), is shown and only seals for rotation and not for axial movement, as the axial movement seal is provided above in reciprocating seals 125. The reciprocating seals 125 (shown in FIG. 1) do not experience rotational or rotary movement, and there is thus no need to provide sealing therefore. These types of seals are well known to those of ordinary skill the art and will not therefore be further described here. FIG. 2 further shows spring 239 and spring 238 around drive spindle 105.

Figure 3:
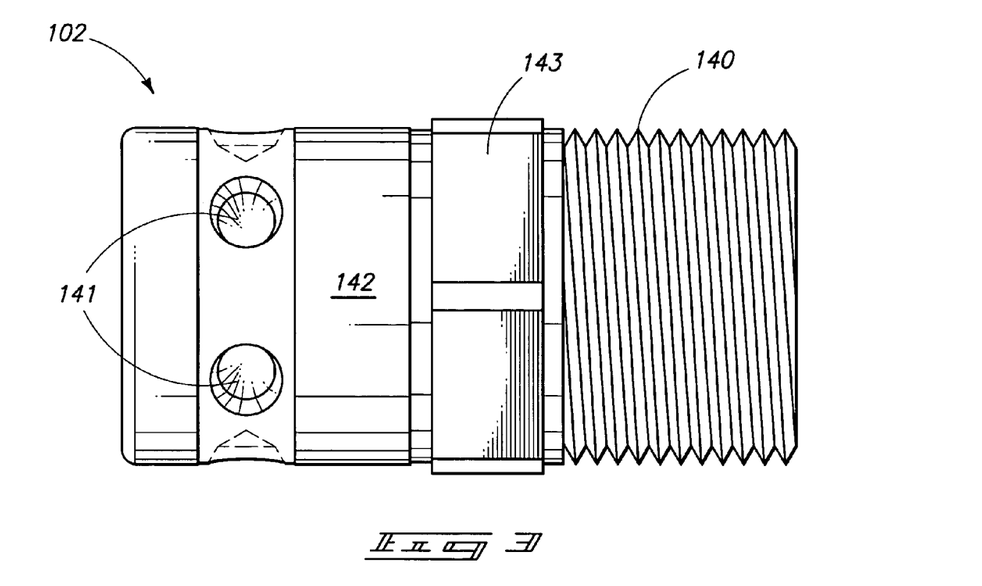
FIG. 3 is an elevation view of an embodiment of a mini-insert which may be utilized in the embodiment of the invention illustrated in FIG. 1.

Drive ball 235 moves alternatively between reverse drive member 236 and forward drive member 237 to provide the forward and reverse rotation of the drive spindle FIG. 1053 is an elevation view of an embodiment of a mini-insert 102 which may be utilized in the embodiment of the invention illustrated in FIG. 1. The mini-insert 102 includes bearing apertures 141, body 142, hex exterior 143 and external threads 140. As shown in FIG. 2, the bearings 145 are held in apertures 141 to hold or secure the mini-insert relative to the drive spindle 105 (shown in FIGS. 1 and 2), while the hex exterior 143 interacts with a corresponding hex interior of the drive spindle 105.

Figure 4:
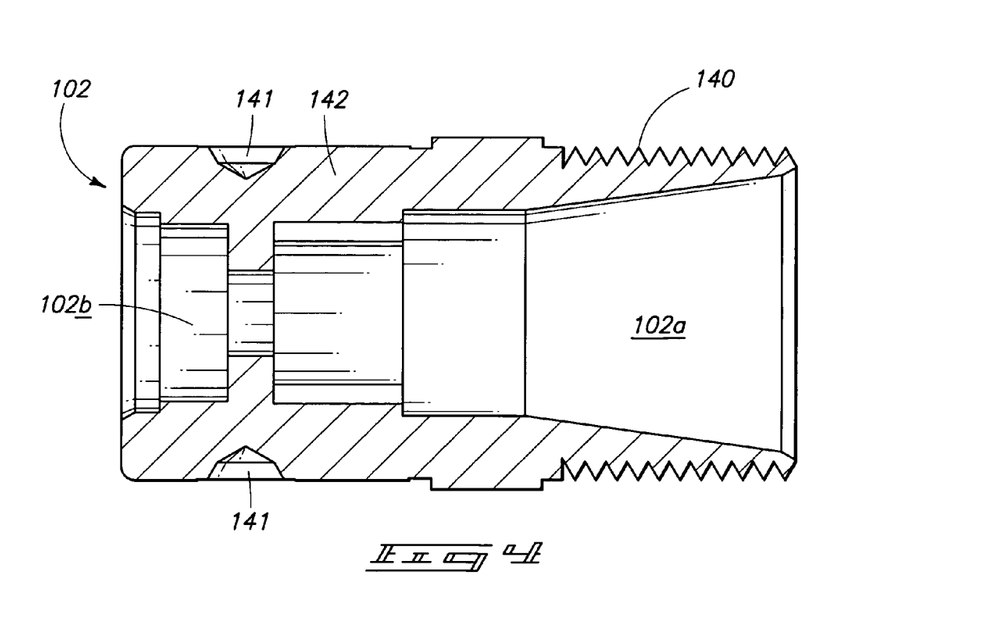
FIG. 4 is a section view of the mini-insert shown in FIG. 3.

FIG. 4 is a section view of the mini-insert 102 shown in FIG. 3, showing insert body 142, first interior cavity portion 102a, second interior cavity portion 102b, and bearing apertures 141.

Figure 5:
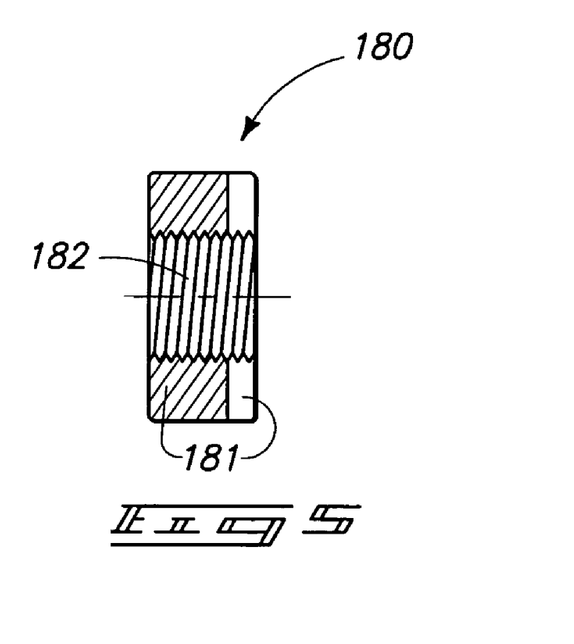
FIG. 5 is an elevation section view of an embodiment of a coolant tube nut which may be utilized in the embodiment of the invention illustrated in FIG. 1.

FIG. 5 is an elevation section view of an embodiment of a coolant tube nut 180 (also shown in FIG. 14) which may be utilized in the embodiment of the invention illustrated in FIG. 1. The coolant tube nut 180 has internal threads 182 in coolant tube nut wing 181, (for rotating the nut more easily) which correspond to the external threads 189 on the coolant tube 109, as more fully shown in FIG. 12.

Figure 6:
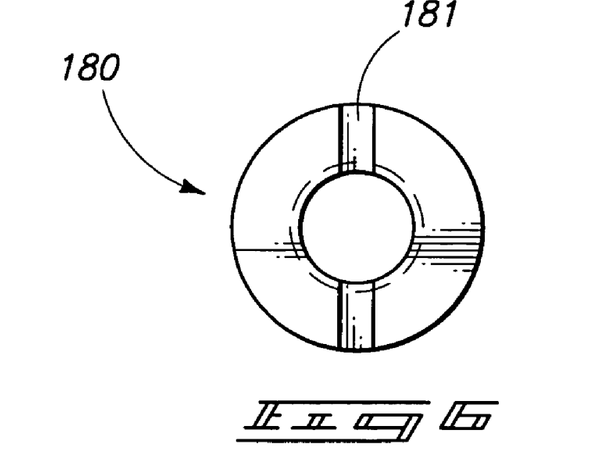
FIG. 6 is an end view of the coolant tube nut illustrated in FIG. 5 and which may be utilized in the embodiment of the invention illustrated in FIG. 1.

FIG. 6 is an end view of the coolant tube nut 180 illustrated in FIG. 5 and which may be utilized in the embodiment of the invention illustrated in FIG. 1, and also shows coolant tube nut wing 181 described above with respect to FIG. 5.

Figure 7:
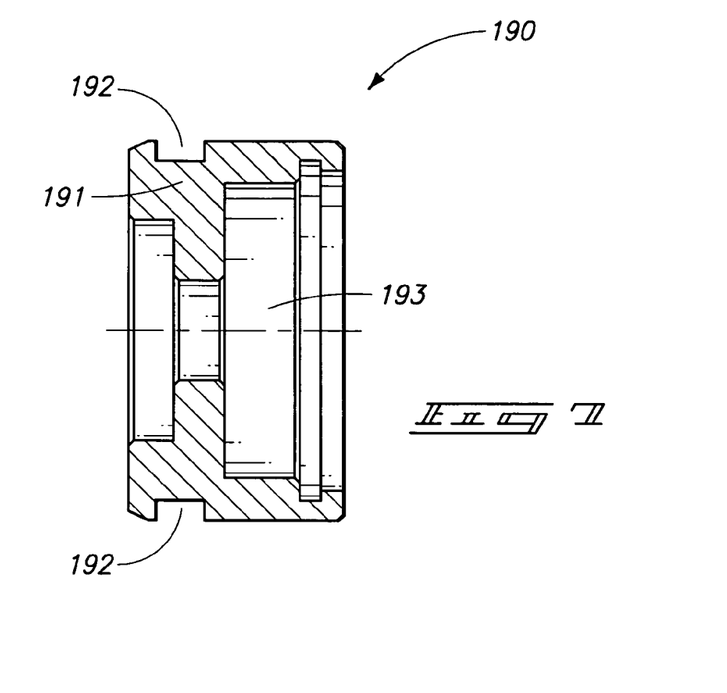
FIG. 7 is an elevation section view of an embodiment of a seal holder which may be utilized in the embodiment of the invention illustrated in FIG. 1.

FIG. 7 is an elevation section view of an embodiment of a seal holder 190 which may be utilized in the embodiment of the invention illustrated in FIG. 1, and as shown in FIG. 1. FIG. 7 shows the seal holder 190 with seal holder body 191, seal aperture 192 or groove for providing rotational sealing, and internal cavity 193.

It will be appreciated by those of ordinary skill in the art that while a hex shape is referred to and used throughout this description, any one of a number of shapes and devices may be utilized to cause one component to rotate with another, with no one in particular being required to practice this invention.

Figure 8:
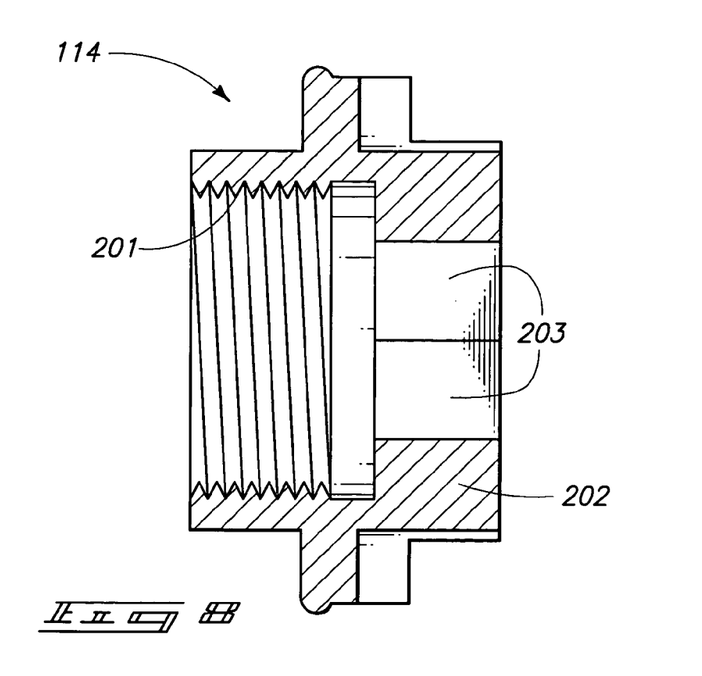
FIG. 8 is an elevation section view of an embodiment of a guide spindle nut which may be utilized in the embodiment of the invention shown in FIG. 1.
Figure 10:
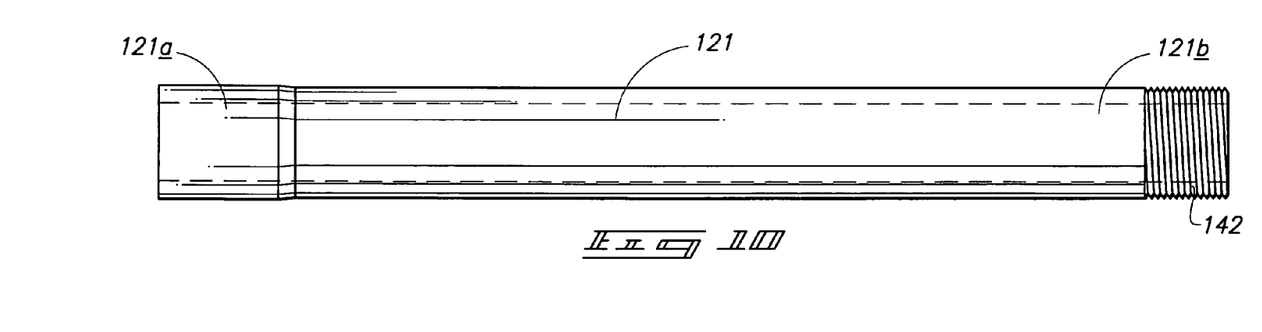
FIG. 10 is an elevation view of an embodiment of a guide spindle which may be utilized in the embodiment of the invention shown in FIG. 1.

FIG. 8 is an elevation section view of an embodiment of a guide spindle nut 114 which may be utilized in the embodiment of the invention shown in FIG. 1, showing guide spindle nut body 202, internal threads 201 which are configured to receive and interact with the external threads 142 on the guide spindle 121 (shown in FIG. 10). The internal hex cavity 203 in guide spindle nut 114 corresponds to a hex shape on the exterior of the coolant tube, which causes or drives the coolant tube 109 (shown in other figures) to always rotate in the forward direction with the guide tube 121, even when the tap has reversed its direction of rotation.

Figure 9:
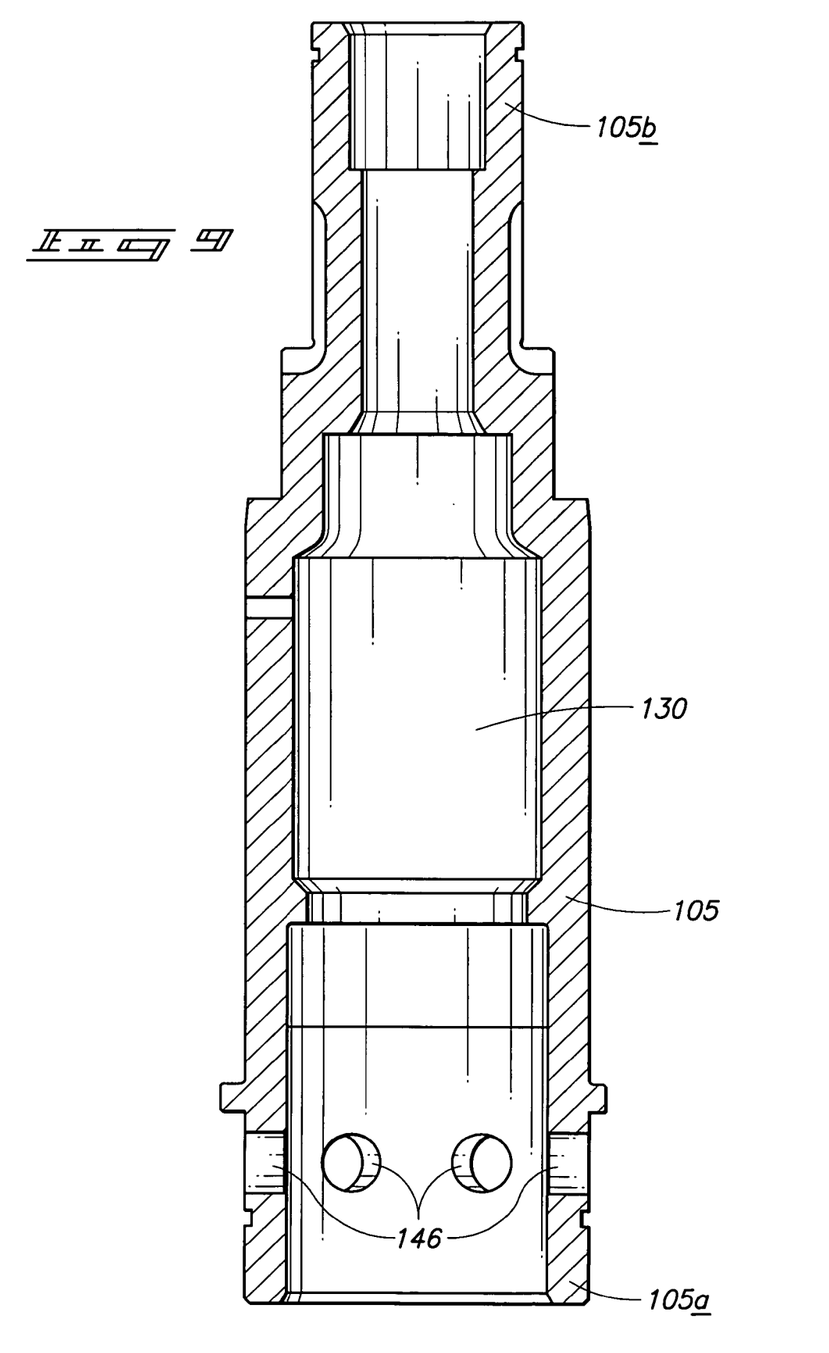
FIG. 9 is an elevation section view of an embodiment of a drive spindle which may be utilized in the embodiment of the invention shown in FIG. 1.

FIG. 9 is an elevation section view of an embodiment of a drive spindle 105 which may be utilized in the embodiment of the invention shown in FIG. 1. FIG. 9 illustrates a first end 105a, which is the lower end, and a second end 105b, which is the upper end, and internal cavity 130. In the embodiment of the invention shown in FIG. 1, the fact that the coolant system does not reverse rotational directions, reduces the part of the mass that reverses rotation and may allow the drive spindle 105 to be made out of a lighter material, thereby further reducing the weight or mass of the reversing components in the system. The drive spindle 105 has typically been constructed out of steel, however aluminum or other lighter materials may now be used in embodiments of this invention.

The bearing apertures 146 in drive spindle 105 provide apertures for an attachment and detachment mechanism to attach different inserts for adapter or tap couplers. In the embodiment shown, bearings 145 are provided between drive spindle 105 and mini-insert 102, and as shown in FIG. 2, with clip 144 on the exterior of the drive spindle 105 providing a force to hold the bearings 145 into corresponding apertures 141 (shown in FIG. 3).

FIG. 10 is an elevation view of an embodiment of a guide spindle 121 which may be utilized in the embodiment of the invention shown in FIG. 1. This embodiment illustrates a generally cylindrically shaped spindle with external threads 142 at a first end 121b, and a second end 121a. The guide spindle has an internal cavity sized to receive the coolant tube 109, as shown in other figures.

Figure 11:
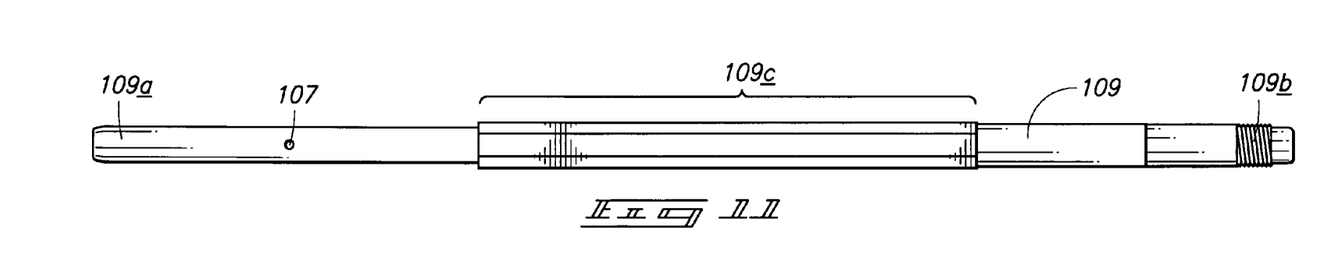
FIG. 11 is an elevation view of an embodiment of a coolant tube which may be utilized in the embodiment of the invention shown in FIG. 1.

FIG. 11 is an elevation view of an embodiment of a coolant tube 109 which may be utilized in the embodiment of the invention shown in FIG. 1, with a first end 109a wherein the internal cavity with internal threads to receive a plug therein (as shown in other figures), and a second end 109b which is the outlet end where coolant is output toward the tap.

Figure 12:
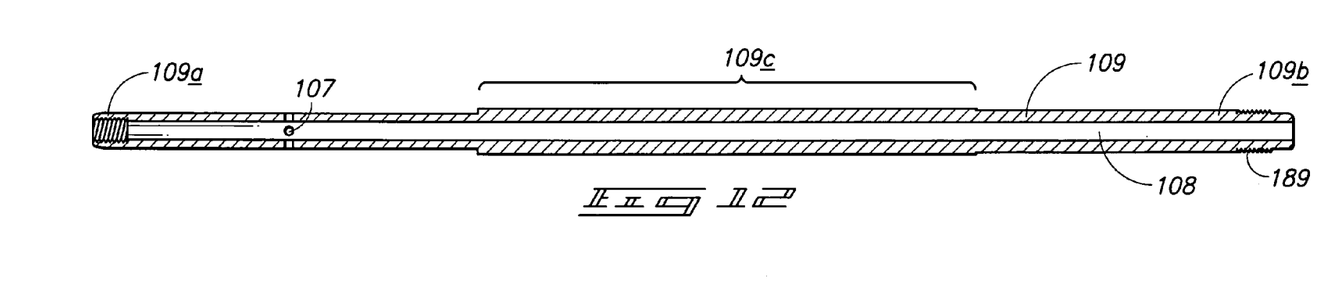
FIG. 12 is an elevation section view of the embodiment of the coolant tube shown in FIG. 11, and which may be utilized in the embodiment of the invention shown in FIG. 1.

FIG. 12 is an elevation section view of the embodiment of the coolant tube shown in FIG. 11, and which may be utilized in the embodiment of the invention shown in FIG. 1, showing coolant tube 109, with a first end 109a, a second end 109b, coolant tube passageway 108, coolant tube external threads 189, coolant aperture 107 (which may be one or more apertures, preferably four). Section 109c of the exterior of the coolant tube is hex shaped to correspond to and generally fit within the guide spindle hex cavity 203 such that the match of the hex configuration causes the coolant tube 109 to rotate with the guide spindle nut 114, and consequently with the guide spindle as well. It will be appreciated by those of ordinary skill the art that while a hex shape is used for convenience, it may be any one of a number of different shapes and configurations to allow the coolant tube to move in a reciprocating way within the guide spindle nut 114, while still be driven to rotate with the guide spindle 121.

Figure 13:
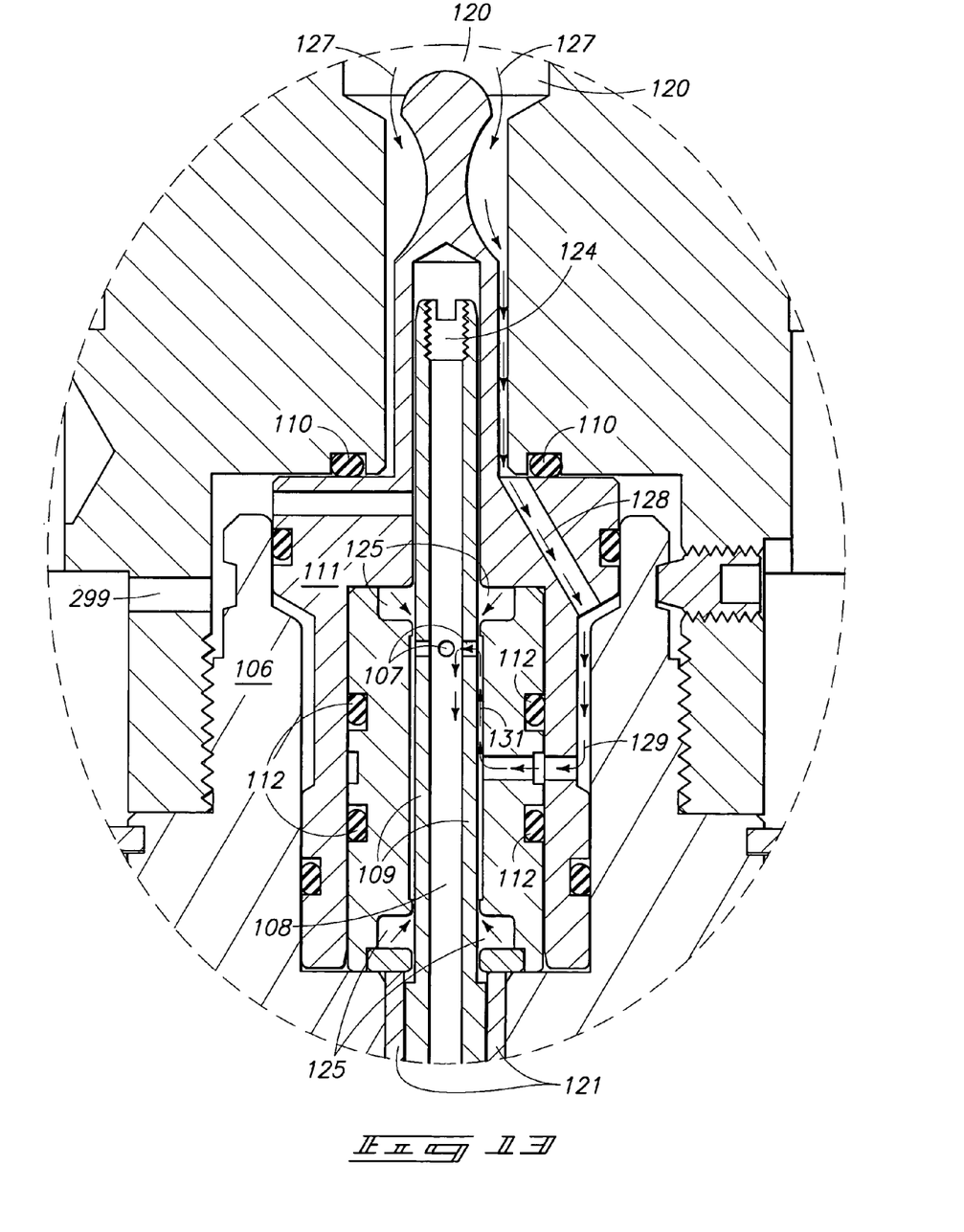
FIG. 13 is detail 13 from FIG. 1.

FIG. 13 is detail 13 from FIG. 1, and shows coolant flow through the upper portion of the tapping attachment. Coolant flow arrows 127, 128, 129 and 131 consecutively show coolant flowing from the coolant entry aperture 120 through passageways, through coolant tube apertures 107 and into the interior cavity 108 of the coolant tube 109.

FIG. 13 further shows coolant tube plug 124, elastomeric O-rings 110, elastomeric O-rings 112, guide spindle 121, housing body portion 106, reciprocating seals 125 are provided at the ends of the upper seal holder 111, to seal through the reciprocating movement of the coolant tube 109 as the tapping attachment goes from forward to reverse and reverse back to forward.

FIG. 13 also shows a high pressure relief passageway 299, which would relieve an over-pressure situation within the high pressure part of the tapping attachment, i.e. the supply of the coolant to the tap. This high pressure system pressure relief is not to be confused with the coolant drainage system described more fully in FIG. 14, which deals with undesirable buildup of fluid or coolant within the interior cavity of the housing where coolant is not desired.

Figure 14:
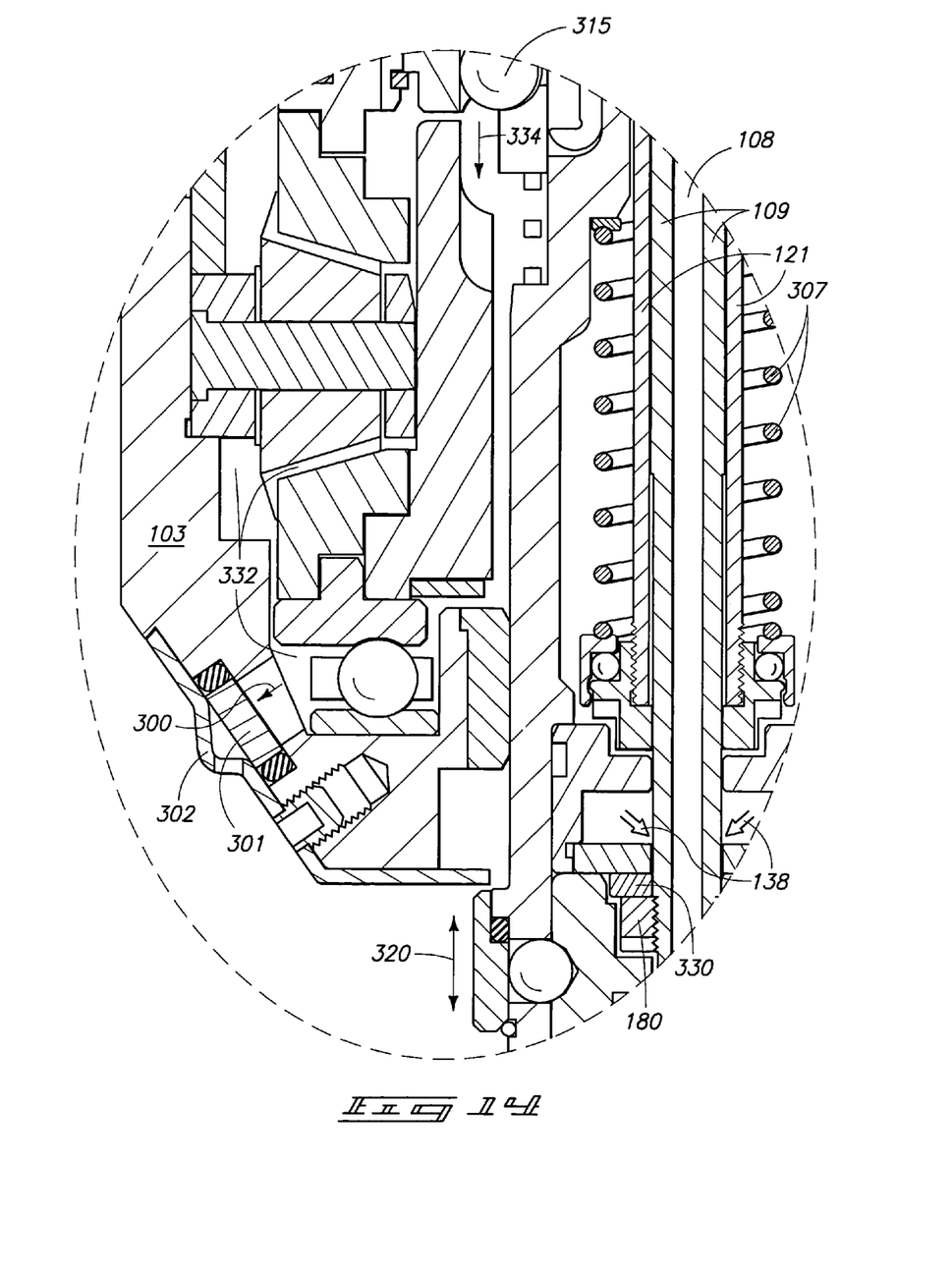
FIG. 14 is detail 14 from FIG. 1.

FIG. 14 is detail 14 from FIG. 1, and illustrates certain aspects of embodiments of the invention, such as the coolant drainage or coolant evacuation system, which may also be referred to as a moisture expeller; as well as other internal components. Coolant from external and/or internal sources will over time collect within the interior cavity or cavities 332 of the housing 103 of the tapping attachment (separate from the high pressure system), either from leakage due to wear or from being drawn in from the operating environment or from external coolant applied all around the tapping attachment. The tapping attachment does not work as desired once a certain amount of coolant has collected within in the internal cavity or cavities 332 of the housing 103. The coolant drainage system illustrated in FIG. 14 shows a filter 301, which allows flow outward from the internal cavities 332, which are throughout the interior of the housing 103.

The filter 301 may be a one-way flow type of filter, a one-way flow valve, or a filter, valve or other barrier that hinders the flow of moisture or coolant into the housing cavity, but which allows the outward flow of coolant. The filter 301 may also keep moisture, coolant, dirt and other undesirable materials from entering the interior cavities 332 in the housing of the tapping attachment, although it need not be designed or configured for that in all embodiments of the invention, so long as the coolant can flow out through the filter.

The coolant would typically flow or drain outward when the tapping attachment is not in use and when stored waiting for its next use. It is preferably, although not required, for the coolant outlet 300 to be located such that coolant may drain out if the tapping attachment is stored vertically or horizontally, and the embodiment shown in this Figure is at an approximate location and angle that allows this. If the coolant outlet 300 is located at or near a lowermost vertical point and/or horizontal point of the interior cavity of the housing, then it provides a drainage system which works when the tapping attachment is stored in the vertical position and/or a horizontal position. Shield 302 may be utilized to hold the filter 301 in place and to help prevent unwanted fluids and contaminants from the filter or interior cavities of the housing.

FIG. 14 further shows anti-friction washer 330, and arrow 320 illustrates the axial reciprocating movement of part of the tapping attachment, as well as rotary seals 138. The rotary seals 138 and the reciprocating seals shown in other figures, may be any one of a number of different types of seals all of which are generally known to those of ordinary skill in the art, with no one in particular being required to practice this invention.

The ball bearing 315 moves relatively in the direction of arrow 334 when the tapping attachment reverses from forward rotation to reverse rotation, as described in prior patents and as is known in the art.

FIG. 15 is an elevation view of an embodiment of a coolant system 119 which may be utilized in the embodiment of the invention shown in FIG. 1. The embodiment of the coolant system may be inserted and/or removed from the embodiment of the invention shown in FIG. 1 and other figures above, and includes coolant tube 109, guide spindle nut 114, guide spindle 121 which may include external threads to engage with guide spindle nut 114. Coolant tube passageway 108 within coolant tube 109 provides a conduit or aperture through which coolant may be received from a source of coolant and routed to or toward the tap.

The coolant system 119 in this embodiment of the invention generally includes a coolant tube 109, an upper seal holder 111 and an upper seal holder body 113, the guide spindle nut 114, and guide spindle 121. The guide spindle 121 is preferably part of the coolant system but is not absolutely necessary as its function may be in other components. It will further be appreciated by those of ordinary skill in the art that for purposes of the coolant system aspect of this invention, one or more of the components may be made integral to one another, all within the contemplation of this invention. However, it is preferable to configure some components separately to achieve objectives of other aspects of other embodiments of the invention.

The coolant enters the coolant tube passageway 108 through holes or coolant apertures 107 in the coolant tube 109 where the coolant tube 109 is within the upper seal holder 111. While not shown, there may be any number of coolant apertures 107 in the coolant tube 109, with four apertures 107 being utilized in this embodiment.

FIG. 15 further shows one way the flow of coolant may be managed relative to the coolant system 119. Coolant flow arrow 117 shows how coolant enters through coolant passageway 118 in the upper seal holder body 113, and is then routed as shown by coolant flow arrow 123 through upper seal holder coolant passageway 116 into coolant gap passageway 122 between coolant tube 109 and upper seal holder 111. Reciprocating seals 125 are provided at the ends at the ends of the upper seal holder 111, to seal through the reciprocating movement of the coolant but 109 as the tapping attachment goes from forward to reverse and reverse back to forward.

Although not shown as well in FIG. 15, it will be noted in other figures that while the guide spindle 121 screws into guide spindle nut 114, the internal hex cavity 203 (shown in FIG. 8) corresponds to and interacts with an external hex on the coolant tube 109 to cause the coolant tube 109 to rotate with the guide spindle 121, although there can be relative reciprocating motion controlled by the hex configuration.

It is generally a more desirable and less expensive seal if only rotation or if only reciprocating motion is being sealed, as compared to the combination of both rotation and reciprocation.

A desirable feature of this embodiment is that even though part of the coolant system is within the drive spindle, the rotation of this coolant system is not the same as the rotation of the drive spindle and this coolant system only rotates in the forward direction. The drive spindle reverses directions as part of the self-reversing function of this invention. It is desirable to remove as much weight and/or mass from the reversing components, for operational, weight, inertia, wear of parts and longevity of the tapping attachment.

Figure 16:
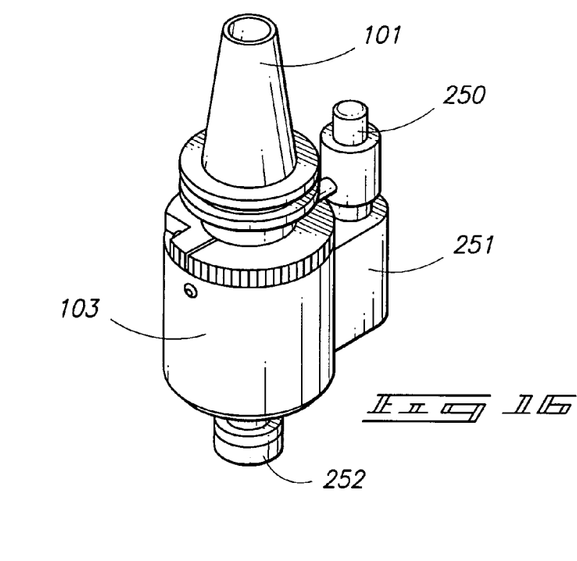
FIG. 16 is a perspective view of a tapping attachment showing the housing and overall appearance.

FIG. 16 is a perspective view of a tapping attachment showing the housing and overall appearance. A stem 250 is disposed in and extends from a closure 251 positioned adjacent housing 103 of the tapping attachment 100 and is connectable in conventional fashion to the driving machine to provide restraint against rotation of the housing 103 of tapping attachment 100 when connected to the driving machine and to permit rotation under particular circumstances when not so connected. Housing 103 defines a central bore for receiving a drive spindle member (shown in other figures).

As will be appreciated by those of reasonable skill in the art, there are numerous embodiments to this invention, and variations of elements and components which may be used, all within the scope of this invention.

One embodiment of this invention, for example, is a self-reversing-tapping attachment with a coolant system, with a drive spindle that rotates in a forward rotational direction and reverses to a reverse rotational direction, and wherein the coolant system only rotates in the forward rotational direction.

Another embodiment of the invention may be a modular coolant system for insertion into a self-reversing tapping attachment which includes a drive spindle with an interior cavity configured to receive the modular coolant system, the coolant system comprising: a coolant tube with an interior cavity.

In yet another embodiment of the invention, a self-reversing tapping attachment is provided which comprises: a housing; a machine shank operatively attached to the housing and configured for operative attachment to a rotation machine; a rotation reversing mechanism operatively attached to the machine shank with a rotational input operatively connected to the machine shank, and with a rotational output which may be reversed; a drive spindle within the housing and operatively attached to the rotational output of the rotation reversing mechanism; a chuck operatively attached to the drive spindle such that the chuck rotates with the drive spindle, the chuck being configured to receive a tap; and a coolant system within the drive spindle, the coolant system only rotating in a forward direction.

The embodiment of the invention in the preceding paragraph may be further wherein the coolant system further comprises: a coolant tube for operative attachment within the drive spindle such that the coolant tube axially slides with respect to the drive spindle and rotates independent of said drive spindle.

In a still further embodiment of the invention, a tapping attachment coolant drainage system is provided which provides for the drainage of coolant from an interior cavity of a tapping attachment housing, the drainage system comprising: a coolant outlet in the housing in fluid communication with the interior cavity of the housing; a coolant filter across the coolant outlet, the coolant filter configured to allow coolant to flow outward through the coolant outlet. Further or additional aspects of this invention may be provided: wherein the coolant filter is configured to only allow the flow of coolant in the outward direction; wherein the coolant filter prevents contaminants from flowing into the interior cavity of the housing; or wherein the coolant outlet is located at or near a lowermost vertical point of the interior cavity of the housing. The coolant outlet may also or alternatively be located at or near a lowermost horizontal point of the interior cavity of the housing.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A self-reversing tapping attachment with a coolant system, with a drive spindle that rotates in a forward rotational direction and reverses to a reverse rotational direction, wherein the coolant system includes a coolant tube and a guide spindle which only rotates in the forward rotational direction and further wherein the coolant system is insertable and removable into the tapping attachment.

2. A modular coolant system for insertion into and combination with a self-reversing tapping attachment which includes a drive spindle with an interior cavity configured to receive a modular coolant system, the modular coolant system comprising: a coolant tube with an interior cavity and a guide spindle surrounding the coolant tube; and further wherein the modular coolant system is configured to only rotate in a forward rotational direction.

3. A self-reversing tapping attachment comprising:
   a housing;
   a machine shank operatively attached to the housing and configured for operative attachment to a rotation machine;
   a rotation reversing mechanism operatively attached to the machine shank with a rotational input operatively connected to the machine shank, and with a rotational output which may be reversed;
   a drive spindle within the housing and operatively attached to the rotational output of the rotation reversing mechanism;
   a chuck operatively attached to the drive spindle such that the chuck rotates with the drive spindle, the chuck being configured to receive a tap; and
   a coolant system which includes a coolant tube and a guide spindle which are insertable and removable within the drive spindle, the coolant system only rotating in a forward direction and which is configured in a slidable relation to the drive spindle.

4. A self-reversing tapping attachment as recited in claim 3, and wherein the coolant system further comprises:
   a coolant tube for operative attachment within the drive spindle such that the coolant tube axially slides with respect to the drive spindle and rotates independent of said drive spindle.

5. A modular coolant system as recited in claim 2, and further wherein the coolant tube axially slides with respect to the drive spindle.

\* \* \* \* \*